Oct. 10, 1967  F. G. BAILEY  3,345,662
MATRICES FOR USE IN CONTOURING WORKPIECES
Filed Aug. 4, 1965

Inventor
Frank Gordon Bailey
by Asher J. Jacobs
Attorney

United States Patent Office 3,345,662
Patented Oct. 10, 1967

3,345,662
MATRICES FOR USE IN CONTOURING
WORKPIECES
Frank Gordon Bailey, 74 Warkton Lane, Kettering,
Northampton, England
Filed Aug. 4, 1965, Ser. No. 479,690
1 Claim. (Cl. 12—142)

ABSTRACT OF THE DISCLOSURE

A smoothly profiled matrix for reduction of shoe soles to different extents in different locations is produced by superimposing on one another around a cylindrical base a plurality of laminations having tinted layer junctions, preparing a plan of contour lines to define positions of junction between layers required by a profiling plan and profiling the laminations to cause the tinted layer junctions between them to conform precisely to the prepared plan.

---

Figure 1:
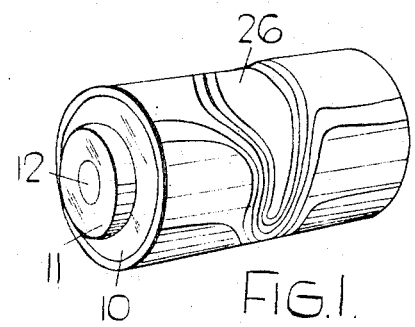

This invention is for improvements in or relating to matrices for use in contouring work pieces and is a continuation of my U.S. application Ser. No. 282,376, filed May 22, 1963, and now abandoned. The invention has for an object to facilitate the profiling of such matrices.

The type of matrix with which the invention is concerned is one which is used to co-operate with a presser between which and the matrix a flexible or yieldable workpiece is engaged and pressed to cause its surface to be deformed into the profile of the matrix so that while thus deformed the substance of the workpiece may be cut partly away to leave its thickness variable according to a required predetermined contour. Such matrices in the form of profiled rollers co-operating with presser rollers are employed in certain known machines used in the manufacture of components for outer footwear, such as soles, insoles or portions of upper materials which are required to vary in thickness and in some cases to have apertures with slanted edges cut into them (as in the case of skeleton insoles), the contouring of the components being determined by the profiling of the matrix. The construction of such a matrix as previously provided is a somewhat laborious manual operation usually performed by filing to the required shape a metal plate attached to the surface of a cylindrical roller forming the base of the matrix. To arrive at the final shape of the matrix depressions and bevels may need to be filed in the metal and these cannot readily be judged for correctness by eye. Consequently during the construction of the matrix repeated trials of its effect on a workpiece are needed until the correct final result is attained. The invention has for an object to facilitate the construction of such a matrix by making it more readily possible to judge by eye when the correct profiling has been effected.

In practicing the invention there is provided a method of producing a profiled cylindrical matrix according to which raised parts of the matrix are constructed from a plurality of superimposed laminations of predetermined thickness the junctions between which are readily discernible, which laminations are mounted on the base of the matrix and shaped by cut-outs or otherwise to provide the required profile. The laminations may be applied singly or as one or more laminated sheets and they may be shaped before or after application to the base of the matrix. By this procedure the profile shaping of the matrix presents lines exposed at the junctions of the laminations which lines give a clear-cut guide as to whether the profiling is correctly shaped and whether different parts of the profiling are in the correct relative positions. Consequently the operation of producing the matrix is facilitated since the shaping can be produced to a prepared plan and the need for repeatedly testing its correctness by trial is largely avoided.

Further, in practising the invention in one convenient procedure the base of the matrix, usually of metal, of exactly cylindrical form has applied and attached to an appropriate area of its surface a laminated sheet or a number of single or laminated sheets to add up to the required total thickness and from the raised part of the matrix. Such raised part is then filed or ground to produce the profiling required. This may involve forming a gradual change in depth of profile across straight or curved lines, usually the latter, and the curves may conform to or form part of undulating loops or elliptical, circular or other shapes. In shaping such gradual slanted portions the lines of junction between the laminations at the slanted exposed edges thereof in the region of the shaping give a clear and accurate representation of the shape attained, in the manner of contour lines on a map, since each line joins points at the same height on the matrix and the spread between the lines at any given place indicates the degree of slant thereat. As a consequence the profiling of the matrix surface to required variations of depth can be carried out much more readily in accordance with a prepared plan to suit the shape required for a particular workpiece.

The method of the invention produces a matrix comprising a base having a plurality of superimposed laminations attached to its surface and contoured to a desired profile by removal of portions of a plurality of the laminations. A profiled matrix as just referred to has portions of the laminations partially removed to provide the required profiling and has interposed tinted interlayers between the laminations providing at the profiled portions lines similar to contour lines whereby the profiled shape of the matrix can be readily observed.

Figure 4:
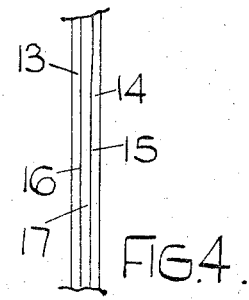
Figure 2:
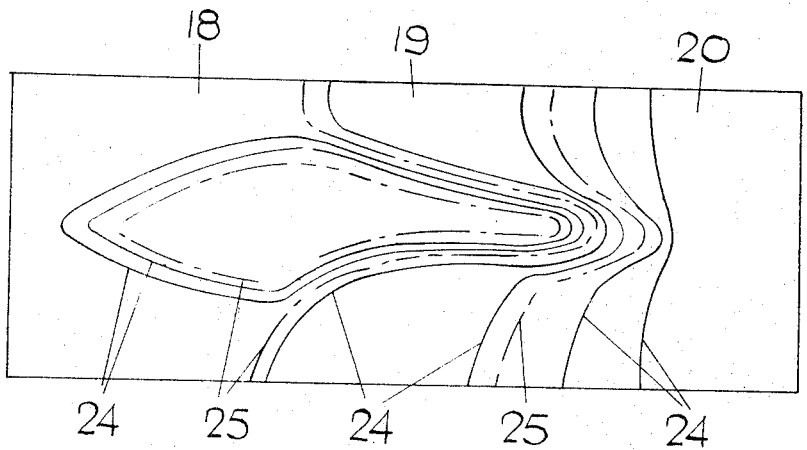
Figure 3:
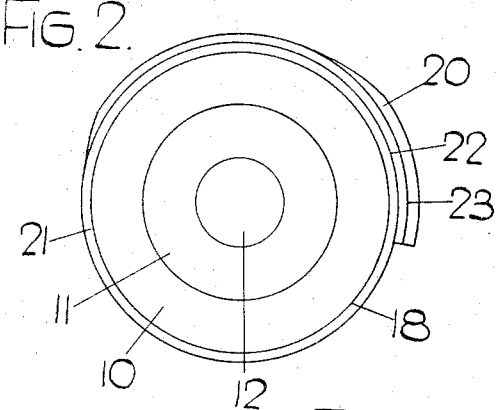

A preferred procedure used in practising the invention will now be described with reference to a form of matrix illustrated by way of example in the accompanying drawings in which:

FIGURE 1 is a perspective view of a matrix roller adapted for use in reducing the thickness of shoe soles, FIGURE 2 is a somewhat enlarged developed view of the profiled contour of the roller, FIGURE 3 is an end view of the roller showing on a somewhat exaggerated scale its built up exterior surface, and FIGURE 4 is an enlarged cross sectional view of a portion of multi-layer material used in forming the matrix.

For the purpose of illustration a matrix roller having a profiled operative surface suitable for use in reducing soles for ladies Louis heeled shoes is shown, such soles having heel flaps which require to be reduced in substance at the sides and across the whole width of the flaps towards their ends in a predetermined manner, while reduction is also required around the sides of the forepart and waist of the soles. Obviously for other kinds of soles different profiling of the matrix will be required to suit the particular extent and positioning of the reduction in substance required.

As shown in the drawings the matrix seen as a whole in FIG. 1 is in the form of a roller comprising a central metallic hollow cylindrical member 10 having end bosses 11 apertured at 12 for mounting on a shaft. On the periphery of the cylinder 10 there are applied and secured in position a plurality of superimposed laminations which in the example illustrated may be formed of ply-wood by application of three layers of three-ply wood two of which do not extend over the whole circumference of the roller. The matrix profile is formed in a plurality of the superimposed laminations by cutting, filing and/or grinding thereon one or more shaped depressions which merge smoothly into the top surface of the roller formed by the outermost lamination in the appropriate region. A main depression conforming in general shape to a shoe sole is indicated at 26 in FIG. 1. The central part of this is at the depth of the surface of the metal cylinder 10 and its sides are slanted at slight angles (which differ at different places around the depression) to merge smoothly into the top level of the matrix.

The matrix roller shown is adapted for use in performing thickness reducing operations on soles with heel flaps which, in a reducing machine, are passed between the matrix roller and a co-operating presser roller of yieldable material so as to deform the sole into the shape of the depression. Whilst so depressed the sole is formed edgewise against a straight knife which trims away the sole portions which project furthest from the axis of the matrix roller.

The ply-wood employed is conveniently such that each three-ply layer has a thickness of ⅓₂ of an inch, corresponding to a thickness of one and a half irons, and providing ⅟₉₆ of an inch (half an iron) thickness for each lamination, the adhesive interlayers being of negligible thickness. The three-ply wood is conveniently such that its layers are secured by means of a tinted adhesive providing a contrasting film-like interlayer between the layers of wood. FIG. 4 illustrates a section of such ply-wood, the wood layers being indicated at 13, 14 and 15 and the coloured adhesive interlayers at 16 and 17. FIG. 3 illustrates one layer of ply-wood at 18 as extending completely around the cylindrical member 10, a second three-ply layer indicated at 19 extending about half way around the roller and a third three-ply layer indicated at 20 extending around only about a quarter of the periphery of the member 10, this being a suitable arrangement for the particular profiling required with the matrix shown.

The ply-wood layers 18, 19 and 20 are secured in place by adhesive which preferably also contrasts in colour to the wood conveniently in a different manner from the contrasting adhesive interlayers at 16 and 17. The adhesive interlayers securing the three-ply layers in place are indicated at 21, 22 and 23 in FIG. 3, these being for example blue in colour whilst the interlayers 16 and 17 are red.

In performing the procedure in accordance with the invention the superimposed laminations on the matrix are contoured to a desired profile by removal, as by grinding or filing, of appropriate portions of a plurality of laminations. In performing the profiling the operator is guided by the fact that as soon as the outermost lamination has been penetrated a marker line is discernible at the junction between it and the next lamination and when several laminations are penetrated a set of lines, similar to contour lines on a map, is displayed. By continuing with the profiling procedure in the appropriate manner these lines are caused to take up an arrangement in accordance with a predetermined pattern thereby indicating that the profiling has been correctly formed in accordance with the requirement. Repeated trial of the matrix on a workpiece to test whether profiling is proceeding correctly is thereby made unnecessary as the "contour" lines by their position and spacing indicate with accuracy in what directions and what extent the shaping of the matrix has proceeded. In the example illustrated the "contour" lines are clearly shown in FIG. 2 wherein full lines indicated at 24 are formed by exposure of the adhesive interlayers in the ply-wood sheets while chain lines indicated at 25 represent lines produced by exposure of adhesive interlayers between the ply-wood sheets and between the lowermost sheet and the base 10. The work of properly profiling the matrix can be facilitated by use of a contour plan marked on a transparent sheet which can be applied over the matrix to check whether the lines on the latter coincide with the lines on the plan. Such a plan can also be used for checking the correctness of the finished matrix.

When the profiling of the matrix has been completed the profiled outer surface may advantageously be coated with an appropriate hardening varnish to provide a durable shaped surface. A suitable varnish for this purpose is that known commercially as "Furniglas" Hard Set.

In an alternative method of procedure the raised parts of the matrix may be formed by building up singly on the base 10 separate sheets forming the individual laminations which have been preformed to the required shapes by being cut along lines corresponding to the lines 24 and 25. By using relatively thin laminations shaped to the required contour lines and subsequently building up the laminations on one another in correct relationship, the approximate final contour is obtained making it unnecessary to perform more than a small amount of filing or grinding on the built-up matrix in order to produce the required smooth surface finish in the final profile. With thicker preformed laminations the shaped edges may be slanted or an appropriate hardening adhesive filler may be used to fill the step-like recesses between adjacent laminations after their assembly.

The laminated sheet or sheets or single sheets applied to the base of the matrix may be formed of other materials than wood, suitable alternative materials being for example metal or plastic, arrangements being made to provide that abutting surfaces of the laminations will present a contrasting appearance to the material of the laminations themselves, preferably by use of a tinted bonding interlayer. Alternatively or in addition the substances of the laminations themselves may have contrasting appearances so that each lamination is readily distinguished from its neighbours in edge or sectional view. Sheets of ply-wood used as aforesaid offer the advantage of providing both contour lines by means of contrasing adhesive interlayers and also differences of appearance in profiled edge view due to the directions of the grain in adjoining laminations being different as in normal ply-wood construction.

Instead of having a spindle mounted roller such as 10 to form the base of the matrix, such base may be formed by a cylindrical metal sleeve adapted to be detachably mounted on a supporting roller and keyed thereto and preferably held in place on the roller by a quick release detent. A plurality of matrices on sleeves and profiled to suit soles of different types, shapes or sizes can thus be readily made interchangeable for mounting on the same roller as required.

What I claim is:

A method of producing a smoothly sloping profiled matrix for reduction of thickness of shoe soles to different extents in different locations which comprises the steps of:
 (a) wrapping in superimposed relation around a cylindrical base a plurality of laminations having tinted layer junctions;
 (b) preparing a plan of contour lines to define positions of junction between layers required by a particular profiling plan; and
 (c) profiling said laminations to cause the tinted layer junctions between them to conform precisely to the prepared plan.

References Cited
UNITED STATES PATENTS

| 1,673,874 | 6/1928 | Jones | 12—146 X |
| 1,788,407 | 1/1931 | Prentis | 161—39 X |
| 2,082,057 | 6/1937 | Hood | 12—17 |
| 3,157,559 | 11/1964 | Menconi et al. | 161—413 |

PATRICK D. LAWSON, *Primary Examiner.*